United States Patent [19]
Jiskoot

[11] Patent Number: 5,639,200
[45] Date of Patent: Jun. 17, 1997

[54] SWEEP DRIVE UNIT

[76] Inventor: Sidney Jiskoot, 5858 360th St., Sanborn, Iowa 51248

[21] Appl. No.: 570,352

[22] Filed: Dec. 11, 1995

[51] Int. Cl.⁶ .................................................. B65G 65/46
[52] U.S. Cl. .................. 414/310; 198/510.1; 414/312; 222/412
[58] Field of Search .................. 74/76, 116, 575; 414/304, 305, 306, 307, 310, 311, 312, 313, 314, 315, 316, 319, 320, 321, 322, 326, 288, 287; 198/510.1, 300, 310; 222/412, 413

[56] References Cited

U.S. PATENT DOCUMENTS

| | | | |
|---|---|---|---|
| 1,383,594 | 5/1921 | Bennett | 198/510.1 |
| 3,050,201 | 8/1962 | Humphrey | 414/310 |
| 3,647,094 | 3/1972 | Jackson | 414/312 |
| 3,743,117 | 7/1973 | Frezzo et al. | 414/312 |
| 4,063,654 | 12/1977 | Shivvers | 414/310 X |
| 4,377,364 | 3/1983 | Weaver | 414/310 X |
| 4,386,695 | 6/1983 | Olson | 414/310 X |
| 4,426,187 | 1/1984 | Olson | 414/310 |
| 4,534,693 | 8/1985 | Weaver | 414/310 X |

*Primary Examiner*—Frank E. Werner

[57] ABSTRACT

A drive for a grain bin unloading sweep adapted to move the sweep around the bin in a series of steps. The operating mechanism includes a friction wheel adapted to ride on the floor of the bin to move the sweep flighting, and a pawl and ratchet to drive the wheel. The whole mechanism is located so as to make possible the rotation of the sweep around the full circumference of the bin.

12 Claims, 1 Drawing Sheet

SWEEP DRIVE UNIT

BACKGROUND AND SUMMARY OF THE INVENTION

This invention pertains to auger-type devices adapted to move grain from the bottom of a grain bin into a center sump to be delivered commonly to an under bin auger from which the grain will be loaded onto a truck, wagon or the like to be moved.

Bins for the storage of grain now usually are of circular cross section so that unloading sweeps pivoted at the center of the floor can sweep fully across that cross section to move the grain from the bin. These sweeps normally use a special flighting to drive the grain to a central point where the grain moves into a conveyor to be delivered to a spot outside the bin. That outside spot is frequently an elevator designed to deliver the grain to a truck or wagon for removal of the grain from the premises.

In order to be effective, the sweep must move around the floor of the bin and is therefore ordinarily pivoted at the center and is driven circumferentially of the bin. That driving is accomplished usually by either a wheel at the end of the axle on which the fighting is mounted or by some sort of "walking" device mounted at the same location. Both of these expedients require substantial space at the end of the sweep and both have friction devices engaged with the floor of the bin in an area covered by grain. The wheel in particular may rotate at a speed in excess of its ability to move the sweep so there is constant wear of the material on the rim of the wheel.

By the present invention, applicant provides a friction wheel operating in a space recently cleared by the sweep. It is driven by a ratchet and pawl device to provide a forward speed more nearly approaching a speed at which the circumference of the drive wheel will maintain contact with the floor of the bin without constant skidding so that there is less wear on the rim of the wheel and more regular advancing of the sweep.

DESCRIPTION

Figure 1:
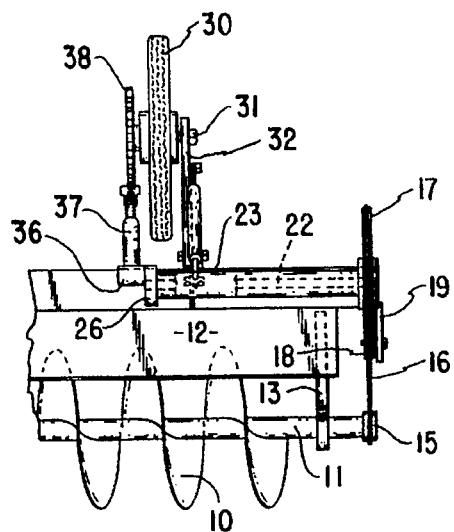
FIG. 1 is a top plan view of the outer end of a bin sweep auger device showing the sweep drive in place
Figure 2:
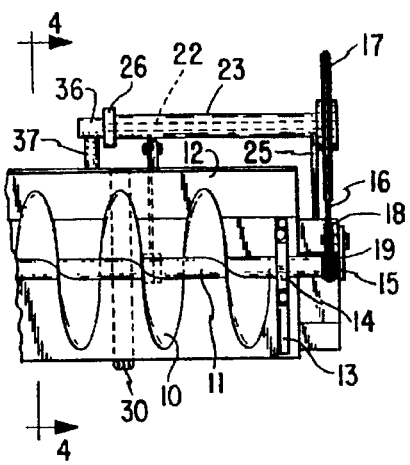
FIG. 2 is a front elevational view of the machinery shown in FIG. 1.
Figure 3:
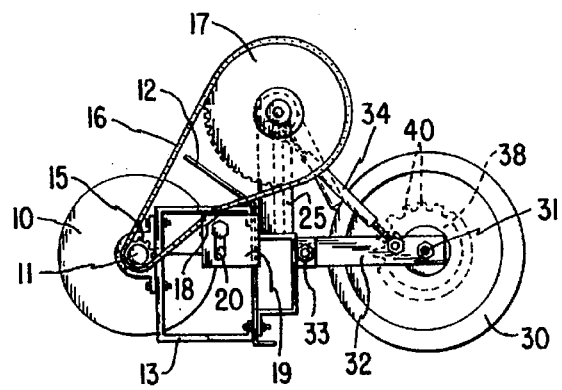
FIG. 3 is an end elevational view of the device of FIGS. 1 and 2.

Briefly, this invention comprises a drive for a bin sweep device in which the drive wheel is located behind the sweep and not at its end and is driven by a pawl and ratchet means so as to slow the number of revolutions of the drive wheel and to allow a very compact unit.

More specifically and referring to the drawings, the drive is used in conjunction with a sweep device. The sweep includes an auger 10 on a drive auger shaft 11. The auger shaft is journalled in a frame composed of a shield 12 supporting an end frame 13 in which a bearing 14 is mounted.

The drive means is driven from the shaft 11 through a drive sprocket 15 which drives a chain 16. That chain, in turn, drives a larger driven sprocket 17. The ratio between the sizes of these sprockets is not a fixed ratio. However, in order to slow the drive for the sweep, it is reasonable to achieve some of that slowing by using different sized sprockets. An idler sprocket 18 may be used to keep the chain firmly in contact with the two active sprockets. This idler sprocket may be mounted on a bracket 19 on the end frame 13 and may be made adjustable by using a plate with a slot 20 to provide for a variable position of the axle on which the idler is journalled.

The sprocket 17 is fixed to a shaft 22 journalled in a housing 23 mounted on the end frame 13 by a post 25. The shaft 22 extends substantially parallel to the auger shaft 11, from the outer end of the auger back somewhat towards the pivot of the rotary travel of the auger. The shaft 22 carries a disc 26 on the end opposite the sprocket 17, and having an axis eccentric to the axis of the shaft 22. This eccentricity is useful in driving the drive wheel as will appear.

The drive wheel 30 runs on an axle 31 attached to a mounting bracket 32. This bracket is pivotally attached by a bolt 33 to the frame 13 so that the wheel 30 can be adjustably raised or lowered. Adjustment of that bracket 32 is accomplished through a turn buckle device 34 attached between the bracket 32 and the post 25. By extending the turn buckle 34, the wheel 30 can be pushed downwardly until it is lower than the lowest edge of the auger 10. This position could result in a very good driving relation between the wheel 30 and the floor of the bin, but would allow some of the grain in the bin to slide beneath its auger. Shortening of the turn buckle would have the opposite effect. The net result is that the vertical position of the wheel 30 can be adjusted for more or less friction of the drive wheel 30 with the floor of the bin and for more or less complete sweeping of that floor by the auger.

Preferably, the mounting bracket 32 is spaced inwardly from the end of the sweep. In this way, the mechanical parts at the end of the sweep can be kept to a minimum so that as little space as possible exists between the end of the sweep and the outer wells of the bin in which the sweep is located.

The wheel 30 is driven from the shaft 22 using the eccentric disc 26. The drive mechanism includes a pawl device having a bearing band 36 wrapped around the disc 26. A bar 37 extends from that bearing band toward a ratchet wheel 38. In most uses, this bar could extend to a fitting at the outer end having a lip 39 adapted to engage the teeth 40 on the ratchet 38. Thus, each rotation of the eccentric disc 26 will cause the bar to advance and retreat. The lip 39, by pressing on a tooth 40 will then cause the wheel 30 to advance. If the wheel can be held in each advanced position while the bar retracts, there can be continuous advancing.

The device to hold the wheel is also associated with the ratchet 38. An arm 43 is pivoted to the post 25 and includes an extension 44 adapted to engage the teeth 40 of the ratchet to hold the tooth from slipping back to its original position.

In order to provide for re-engagement of both the lip 39 and the extension 44, it is necessary that there be a resilient engagement between those mechanisms and the teeth of the ratchet wheel 38. This engagement is provided by a tension spring 46 engaged between a lever 47 on the bar 37 and a stub 48 on the arm 43. This tension spring 46, by pulling the lever 47 and the stub 48 toward each other tends to move both the lip 39 and the extension 44 into a readily releasable contact with the ratchet 38. Thus, when the eccentric 27 causes the bar 37 to push the lip 39 against the teeth 40 to move the ratchet, the extension 44 will slide over the tooth adjacent the extension and onto the next tooth, thus indexing the position of the wheel 30 which is attached to the ratchet wheel 38. This indexing provides for a reasonable speed of rotation of the wheel 30 and therefore a reasonable speed of advance of the unloading sweep. It will be obvious that the speed can be changed by changing to a ratchet wheel 38 with more or fewer teeth, if desired.

Figure 5:
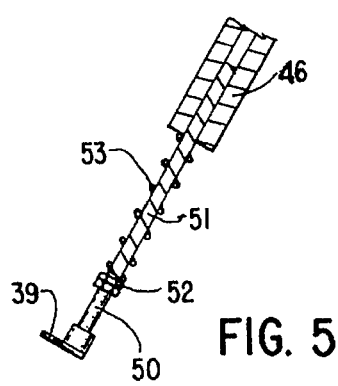
FIG. 5 is a detailed view to an enlarged scale of the ratcheting rod.
Figure 4:
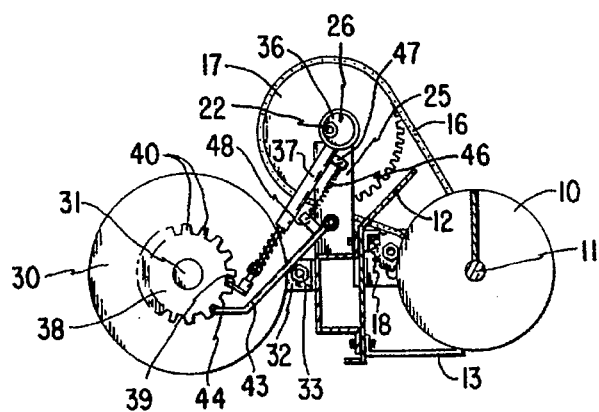
FIG. 4 is a sectional view from line 4—4 of FIG. 2.

It is obvious that the bar 37 can be a simple solid rod or bar and will work well. If the sweep does not advance in response to the ratcheting action, the wheel 30 can simply skid on the surface. However, a refinement to inhibit such skidding action is illustrated and is best shown in FIG. 5. As shown there, the rod 37 is still activated in the same way by the eccentric bearing 36. However, the lip 39 is fixed on a threaded stem 50 which slides into a telescoping member 46. Jam nuts 53 or some similar device may be used to hold the stem 45 in a proper adjusted position relative to the member 46. This latter member is slidingly telescoped into the rod 37 and is urged outwardly from that rod by a compression spring 48 engaged between the rod 37 and the telescoping member 46. Thus, when the lip 39 meets excess resistance from the teeth 40 on the ratchet wheel 38, the spring 48 will be compressed, the wheel 38 will not be turned, and there will be no skidding. As noted above, this is a refinement and is not necessary to the operation of the device.

I claim as my invention:

1. In combination with an unloading sweep for delivery of grain from a storage area, said sweep including a driven auger mounted on an auger shaft, said auger shaft being journalled in a frame; driving means for driving said sweep including a friction wheel mounted on said frame, ratchet wheel means drivingly engaged with said friction wheel to drive said friction wheel, ratchet and pawl means driven by said auger shaft and adapted to engage said ratchet wheel means to index said ratchet wheel in response to rotation of said auger shaft.

2. The combination of claim 1 in which a bracket extends between said frame and said friction wheel whereby said friction wheel can be adjusted relative to said auger, adjustment means engaged between said frame and said bracket whereby the position of said friction wheel can be held in an adjusted position.

3. The combination of claim 1 in which drive means is rotatably mounted on said frame, motion transmitting means engaged between said shaft and said drive means, said drive means being drivingly engaged with said ratchet and pawl means to drive said friction wheel.

4. The combination of claim 3 in which said drive means includes a drive shaft substantially parallel to said auger shaft, said fiction wheel being mounted on said frame at a position inward from the end of said auger whereby said drive shaft extends inward of an end of said auger in a position adjacent said fiction wheel.

5. The combination of claim 3 in which said motion transmitting means is a chain and sprocket device whereby rotations of said shaft are transmitted to said drive means.

6. The combination of claim 3 in which said drive means includes an eccentric means driven by said drive means, said eccentric means being operably engaged with said ratchet and pawl means to drive said ratchet wheel.

7. The combination of claim 6 in which check means is engaged between said frame and said sprocket wheel means to prevent reverse motion of said sprocket wheel means.

8. The combination of claim 7 in which a spring is engaged between said check means and said ratchet and pawl means to hold both said ratchet and pawl means and said check means releasably against said ratchet wheel means.

9. The combination of claim 7 in which said ratchet and pawl means includes a pawl having a lip in position to engage said ratchet wheel, and said check means terminates in an extension engaging said ratchet wheel to hold said wheel from reverse motion.

10. The combination of claim 6 in which said ratchet and pawl means includes a rod means, spring loaded means engaged between said rod means and said ratchet wheel, said spring loaded means adapted to normally advance said ratchet wheel by allowing spring-resisted motion whereby said ratchet wheel can maintain its position by overriding pressure against said spring.

11. The combination of claim 10 in which said rod means includes a main member, a telescoping member slidably telescoped in this said main member and a compression spring engaged between said main member and said telescoping member to provide a spring loading to bias said telescoping member toward said ratchet wheel.

12. The combination of claim 6 in which a bracket is pivotally mounted on said frame, means on said bracket to provide journal means whereby said friction wheel is rotatably mounted relative to said bracket, said bracket being pivotally mounted to allow pivotal action whereby the vertical position of said means to provide journal means is vertically adjustable relative to said shaft whereby said friction wheel can be adjusted relative to a surface on which said auger runs.

* * * * *